Feb. 2, 1937.  E. J. FRASER  2,069,239
TRAILER LIGHT
Filed April 8, 1936
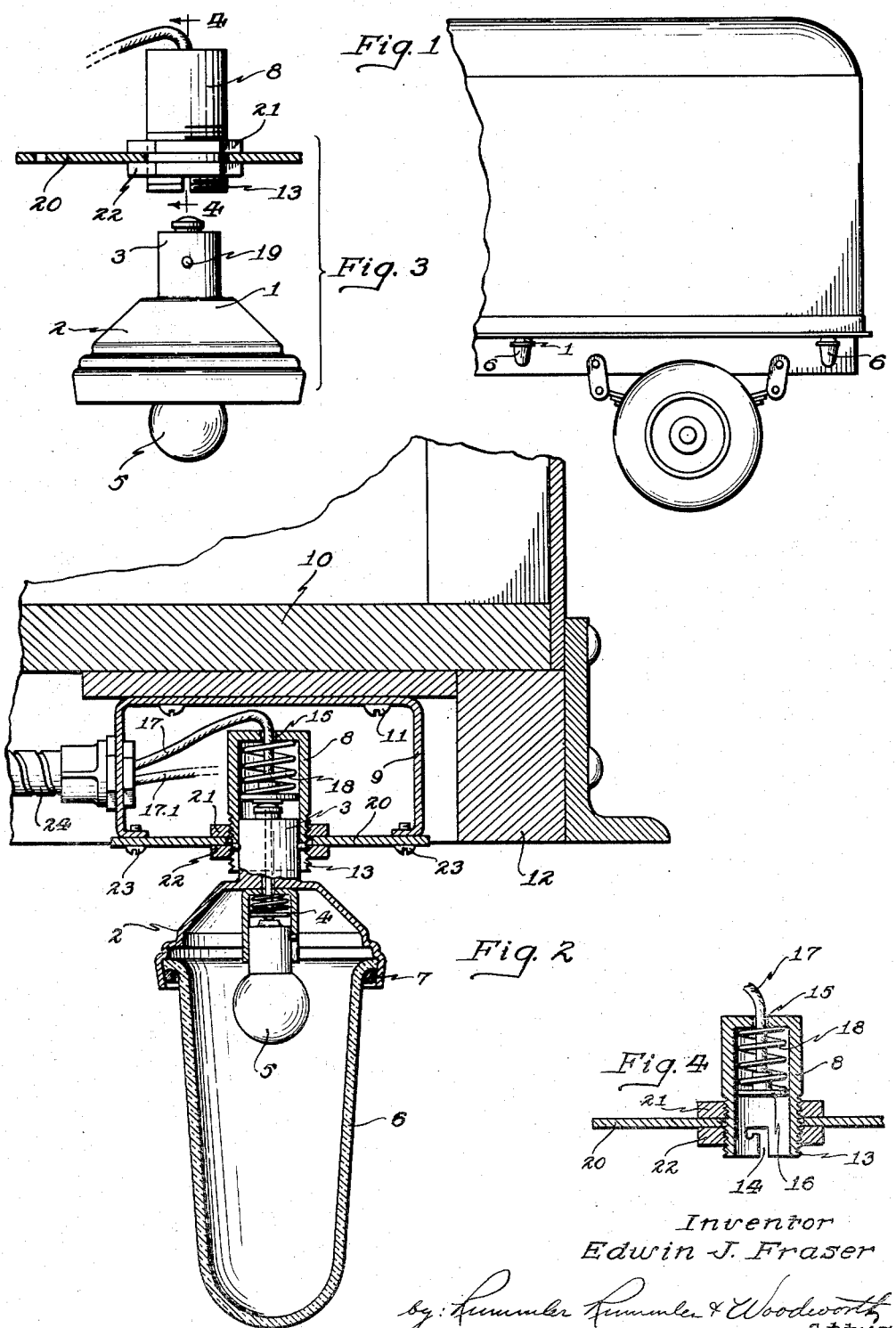
Inventor
Edwin J. Fraser
by: Rummler Rummler & Woodworth
Attys.

Patented Feb. 2, 1937

2,069,239

UNITED STATES PATENT OFFICE 2,069,239

TRAILER LIGHT

Edwin J. Fraser, Riverside, Ill., assignor to Keeshin Motor Express Co. Inc., Chicago, Ill., a corporation of Illinois Application April 8, 1936, Serial No. 73,321

4 Claims. (Cl. 240—7.1)

This invention relates to improvements in riding lights, and particularly to simplified, easily removable light units of the nature disclosed in my copending application Serial No. 66,403, filed February 29, 1936.

Heretofore the riding lights provided for trailers were generally built directly into the trailer body and were so set and constructed that they were extremely difficult to dismantle for repair or the insertion of new bulbs, particularly upon their being broken or smashed by collision or otherwise, in which case the trailer body was usually so broken or dented that immediate repair or replacement of the lights was impossible. This not only produced a serious and expensive problem of maintenance, but also often made it necessary for a trailer to continue after an accident without proper lighting facilities and in direct violation of the state laws. Furthermore, most of the trailers as manufactured are provided with only two riding lights located at the rear, and one light located on the port side at the forward end of the trailer so that when it is necessary to operate the trailer through several states the purchaser is compelled to install additional riding lights in order to comply with the laws of the several states in which the trailer is to be operated. Under such circumstances the maximum number of lights must be provided for on the trailer, and as these lights are generally irremovable, the trailer has to be operated with the maximum number of lights even though traveling in a state where a lesser number of lights is required, with a resultant and unnecessary expense and battery load. It was to overcome these difficulties that the present invention was devised.

The main objects of this invention are to provide an improved trailer light that is readily removable and renewable; to provide as an article of manufacture a new and improved trailer riding light which is detachably secured to the trailer body; to provide a more simplified form and arrangement of trailer light; to provide a unitary trailer light construction capable of severe usage; and to provide an improved trailer riding light which is simple in construction and operation and inexpensive to manufacture.

An illustrative embodiment of this invention is shown in the accompanying drawing, in which Figure 1 is a fragmentary side view of the rear end of a trailer showing trailer lights in operating position.

Fig. 2 is a cross sectional view of an improved lighting unit showing the device and its receptacle attached to a trailer body and in operating position.

Fig. 3 is a view of the device showing the lighting unit detached from the receptacle and with the lens removed, and Fig. 4 is a cross sectional view of the receptacle socket for the lighting unit as taken on line 4—4 of Fig. 3.

In the form shown in the drawing, my improved trailer light 1 is constructed as a unitary device comprising a bell-shaped casing or housing 2, having an integral cylindrical base 3 disposed centrally on the closed end of the casing 2 and projecting therefrom, a lamp socket 4 housed within the casting 2 and secured centrally at the closed end thereof, a lamp 5 and a bowl-shaped lens detachably secured at the open end of the casing by means of a split ring fastener 7 seated in an annular groove surrounding the margin of the open end of the casing.

A receptacle socket 8 for the light unit is mounted in an outlet box 9 which is arranged to be secured to the under side of the floor boards 10 of the trailer adjacent the side frames 12 thereof by means of wood screws 11.

The receptacle socket 8 as shown comprises a hollow cylindrical member opened at one end and externally threaded in the open end as at 13, and a pair of oppositely disposed bayonet slots 14 are formed in its side walls and extend inwardly from the open end. An aperture 15 is provided at the closed end of the socket.

As shown the socket 8 is mounted in the outlet box 9 by securing the same in an opening of the outlet box cover plate 20 by means of lock nuts 21 and 22 which are threaded onto the socket 8 and disposed one on each side of the cover plate. The cover plate 20 is secured to the outlet box 9 in the usual manner by means of screws 23.

The socket 8 is also provided with a disc or button-like contact element or member 16 secured to one end of the lead-in wire 17 and the contact element 16 is arranged to seat on a helical compression spring 18 which is disposed between the end of the socket 8 and the contact element so as to normally urge the latter outwardly.

A conduit 24 is secured to the outlet box 9 in the usual manner and houses the two wires 17 and 17.1 which are connected at one end to a source of current not shown, usually a battery, and at the other end to the contact element 16 and the receptacle respectively.

The base 3 of the lighting unit 1 is provided with a pair of keys or lugs 19 which protrude outwardly from the side walls thereof and the unit is detachably connected to the socket 8 by inserting the base 3 therein, so that the keys or lugs 19 will be engaged with the bayonet slots 14. The base 3 is then forced into the socket, being guided by the bayonet slots, and when the lugs 19 have reached the inner limits of the slots 14 the unit is locked in place by turning the same clockwise whereby the lugs become engaged in the lateral extensions of the bayonet slots and are held therein through the action of the spring 18, urging the contact element 16 against the end of the base 3. The lighting unit may be removed by pressing the unit toward the receptacle socket and turning the unit counter-clockwise, whereupon it may be withdrawn.

It will be readily seen that the present invention completely cures the defects and shortcomings of the usual trailer lighting devices and systems through its unitary construction which is arranged to be readily attached or detached to fixed receptacle sockets. When a trailer has been equipped with the improved lighting units the driver may readily and quickly remove the lighting units from the receptacles when he arrives at a terminal or when entering a state where a lesser number of lights is required, or upon entering a state where additional lighting units are required, such units can be readily placed in operation without difficulty or loss of time.

Another advantage of my improved lighting units is that each trailer tool kit may be provided with a predetermined complement of complete lighting units including spare units for replacement of broken or burned out units, so that each driver will at all times have ample lighting means; also when the units are employed instead of the usual fixed type of lighting devices whenever the trailer is returned to a garage after a run the mechanic, during his routine inspection, can readily test each lighting unit to make sure that the trailer is provided with and carrying the maximum legal complement of serviceable units, as well as a proper number of spares.

Another advantage of the unitary feature for trailer lights is that they may be manufactured and supplied to the trucking companies in large quantities and at low cost, the complete lighting unit being handled substantially in the same manner as the individual light bulbs are now sold and dispensed.

Although but one specific embodiment of this invention is herein shown and described, it will be understood that details of the construction shown may be altered or omitted without departing from the spirit of the invention as defined by the following claims:

I claim:

1. A trailer light of the class described comprising a lighting unit having a casing, lamp socket and lamp housed within said casing, a lens, and an integral protruding base means provided with a lug on the surface thereof, a receptable mounted under the floor boards adjacent an edge of the trailer body, a socket arranged in said receptacle and provided with a bayonet slot to receive said lug for quick connection of said lighting unit to said socket, the exposed face end of said socket arranged to lie in a plane substantially flush with the lower exposed edge of the side frame of the trailer body.

2. A trailer light of the class described comprising an outlet box, a circular receptacle socket mounted therein and provided with a bayonet slot, said receptacle socket being connected to a source of current, and said outlet box being mounted under the floor boards and adjacent an edge of a trailer body, in combination with a detachable lighting unit, comprising a casing, a lamp socket and a lamp housed within said casing, a lens, and a centrally disposed circular base integral on said casing and having a lug thereon; said receptacle socket being arranged to receive and fit said base and said lug being arranged for interfitting engagement with said bayonet slot for semi-permanently connecting said lighting unit and receptacle socket in operative relationship.

3. A trailer light unit construction comprising a bell-shaped casing having an integral cylindrical base protruding from its closed end, said base having a centrally located contact at its end and a protruding lug on its sidewall, a lamp socket and a lamp housed within said casing and having connection with said contact, and a lens removably secured on the open end of said casing, an outlet box secured to the under side of the floor boards adjacent an edge of a trailer body, an electrical socket provided with a bayonet slot arranged in said outlet box and connected to a source of current, the exposed face edge of said socket being arranged to lie in a plane substantially flush with the lower edge of one of the side frames of the trailer body, said light unit being arranged for quick attachment to said socket in said outlet box.

4. As an article of manufacture a trailer light unit comprising a bell-shaped casing having an integral cylindrical base projecting centrally from its closed end, said base having a contact member centrally located on its end and insulated therefrom and a lug protruding from its sidewall, a lamp socket housed within said casing and fastened centrally at the end thereof, a contact in said lamp socket insulated therefrom and having connection with the first named contact member, a lamp removably secured in said socket, and a bow-shaped lens detachably secured on the end of said casing, an outlet box secured to the under side of the floor boards adjacent an edge of a trailer body, an electrical socket provided with a bayonet slot arranged in said outlet box and connected to a source of current, the exposed face edge of said socket being arranged to lie in a plane substantially flush with the lower edge of one of the side frames of the trailer body, said light unit being arranged for quick attachment to said socket in said outlet box.

EDWIN J. FRASER.